April 28, 1970  O. M. HOSTETLER ET AL  3,508,782
SUPPORTING MEANS FOR CONVERTIBLE TOPS
Filed Feb. 27, 1969  2 Sheets-Sheet 1
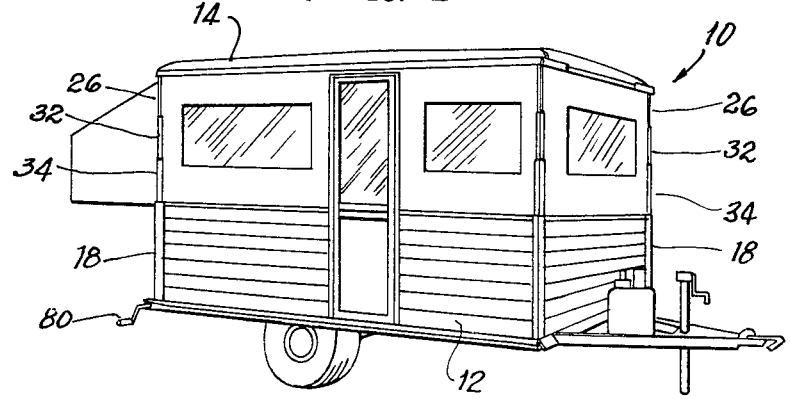
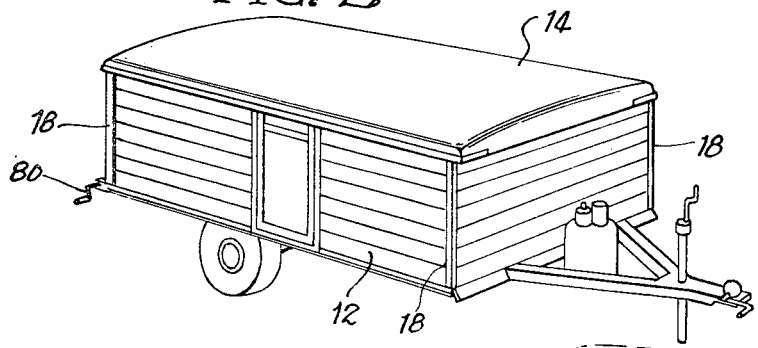
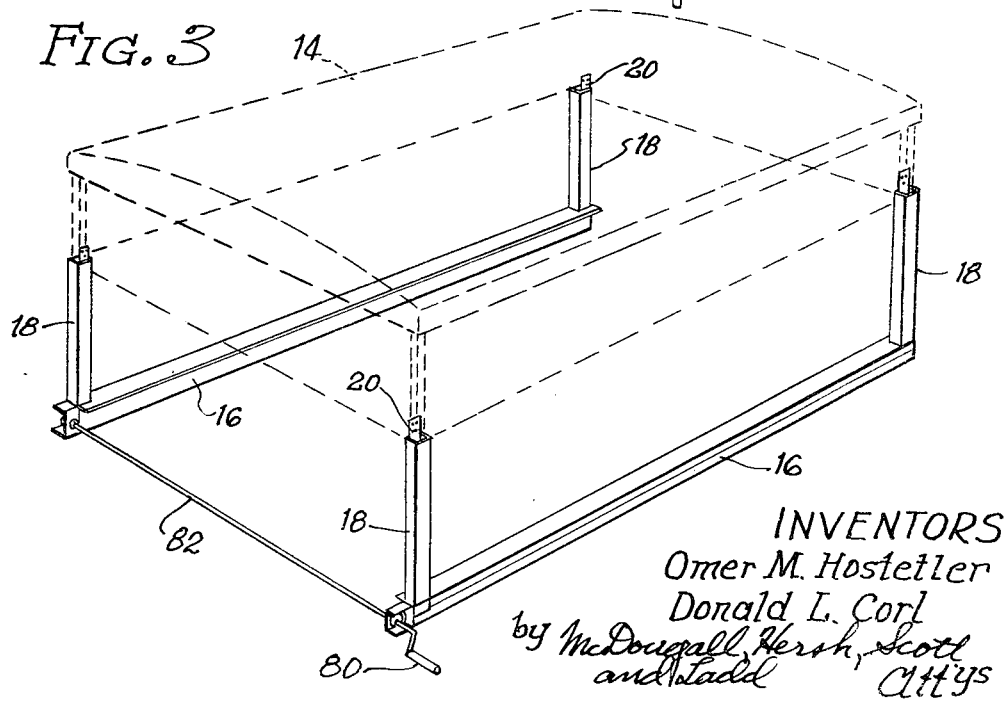
INVENTORS
Omer M. Hostetler
Donald L. Corl
by McDougall, Hersh, Scott
and Ladd
Att'ys April 28, 1970  O. M. HOSTETLER ET AL  3,508,782
SUPPORTING MEANS FOR CONVERTIBLE TOPS
Filed Feb. 27, 1969  2 Sheets-Sheet 2
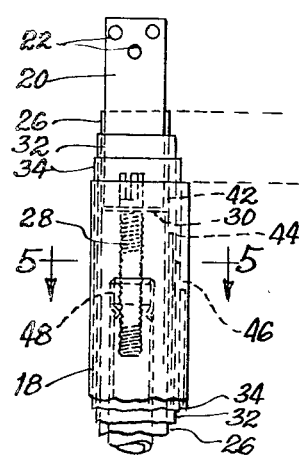
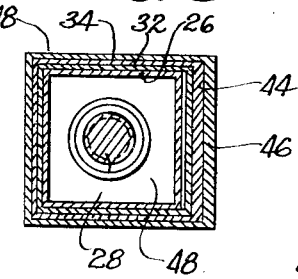
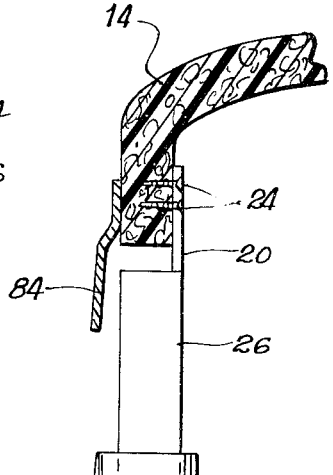
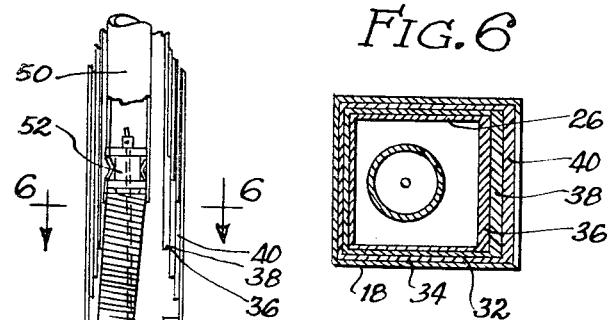
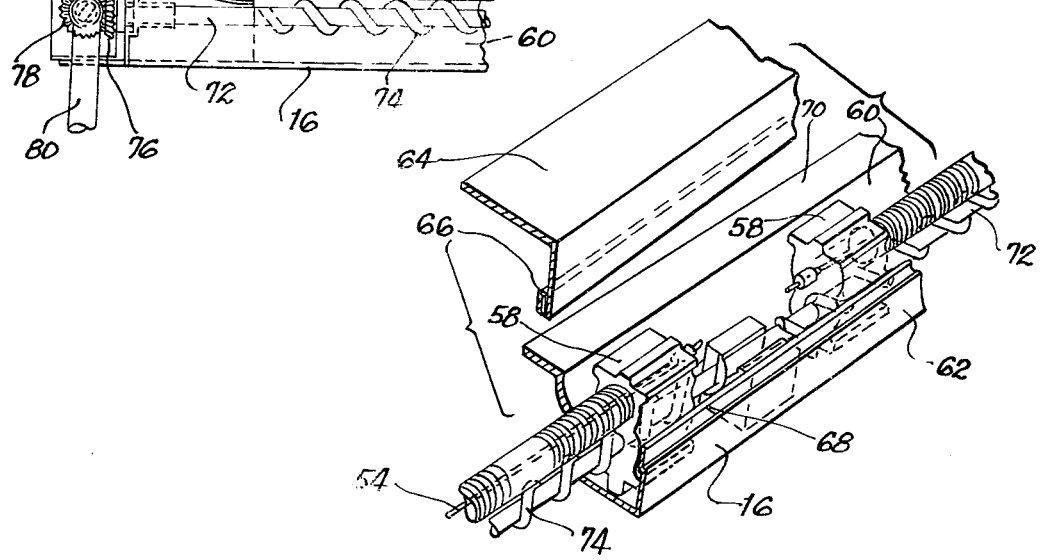

United States Patent Office 3,508,782
Patented Apr. 28, 1970

3,508,782
SUPPORTING MEANS FOR CONVERTIBLE TOPS
Omer M. Hostetler, Nappanee, and Donald L. Corl, Bremen, Ind., assignors to Corl Corporation, Bremen, Ind., a corporation of Indiana
Filed Feb. 27, 1969, Ser. No. 802,941
Int. Cl. B60p 3/32
U.S. Cl. 296—27    7 Claims

ABSTRACT OF THE DISCLOSURE

A construction for raising and lowering and supporting a convertible top comprising flexible drive and supporting elements operatively connected to the top, and a drive screw operatively connected at the ends of the elements for moving the elements in response to rotation of the drive screw. The drive elements are preferably enclosed within telescoping tubular members whereby the drive elements are completely enclosed in the raised position of the top.

---

This invention relates to constructions for raising, lowering and supporting the tops employed in conjunction with convertible trailers, campers or the like. Specifically, the invention is concerned with means for elevating the top through operation of drive means which can be easily operated by the user of the trailer. The same drive means includes supporting means for the top in its elevated position as well as means for lowering the top back into engagement with the trailer body.

The construction of this invention is preferably used in conjunction with structures referred to as convertible mobile homes, campers, or house trailers. Convertible tops for such structures may comprise fibre glass bodies or other rigid or semi-rigid bodies. The tops in their lowered positions engage the camper or trailer body, often referred to as the "box." The box and top thus provide a relatively compact unit, and the contents are protected from the elements.

In the raised position, a canvas or some other flexible wall is interposed between the box and the top to provide a complete enclosure. The canvas may be connected to the top and box so that it will be automatically unfolded as the top is raised.

The top, even though formed of fibre glass or some other relatively light material, is of substantial size and relatively heavy. Accordingly, relatively strong structural members must be provided for supporting the top in its uppermost position. In addition, some means must be provided so that the top can be raised by the individual or individuals using the camper.

It is a general object of this invention to provide an improved structure for use in the raising and lowering, and supporting of tops of the type used on trailers, or convertible trailers, campers and similar mobile constructions.

It is a more specific object of this invention to provide a construction of the type described which is characterized by a high degree of rigidity in the raised position so that completely adequate support for the top will be provided.

It is a still further object of this invention to provide a construction of the type described which can be easily operated by a single individual so that raising and lowering of the top can be accomplished without any significant effort.

It is an additional object of this invention to provide a construction of the type described which is manufactured from a few relatively simple and easy available parts whereby the manufacturing and maintenance costs can be kept at a minimum.

These and other objects of this invention will appear hereinafter and for purposes of illustration, but not of limitation, specific embodiments of the invention are shown in the accompanying drawings in which:

FIGURE 1 is a perspective view of a convertible trailer utilizing supporting means of the type contemplated by this invention;

FIGURE 2 is a perspective view of the trailer with the top in the lowered position;

FIGURE 3 is a perspective view illustrating the supporting frame which is disposed within the trailer body and which encloses the raising and lowering construction of this invention;

FIGURE 4 is a fragmentary view, partly in section, illustrating the drive means for the raising and lowering construction;

FIGURE 5 is a horizontal sectional view taken about the line 5—5 of FIGURE 4;

FIGURE 6 is a horizontal sectional view taken about the line 6—6 of FIGURE 4;

FIGURE 7 is a fragmentary view illustrating the raising and lowering means in a partially extended position; and, FIGURE 8 is a fragmentary perspective view illustrating the drive screw employed in the construction in association with the nut means which are attached to the raising and lowering means.

The raising and lowering, and supporting means of this invention generally consist of elongated flexible drive members. Means are provided for connecting the upper ends of these members to the top which is associated with a trailer box or with the lower housing of a camper or other mobile construction. The other end of each flexible drive means is connected to a nut which is adapted to be driven transversely of the trailer box by means of a drive screw. When the user of the construction rotates the drive screw, the flexible drive means will move in unison to impart raising or lowering movement to the top.

The upper end of each flexible drive means is preferably connected to a surrounding telescoping arrangement. As the flexible drive means moves upwardly, the tubular elements of the telescoping arrangement will follow so that the flexible drive means will be continuously enclosed to provide protection from the elements and to also insure rigidity from a supporting standpoint.

FIGURES 1 and 2 illustrate a convertible trailer construction 10 made up of box portion 12 and including a top 14. As indicated, the top 14 is preferably formed of relatively rigid material such as fibre glass so that it will provide a protective covering for the construction.

FIGURE 3 illustrates the frame means utilized in association with the construction of this invention. The frame consists of longitudinally extending hollow elements 16 which are adapted to rest on the floor of the box 12. Vertically extending hollow posts 18 are secured to the elements 16, and the posts 18 extend substantially to the upper edge of the box 12. Additional frame members extending transversely between the members 16 may be provided; however, the frame may also be maintained in position relative to the walls of the box 12 through the use of suitable fasteners.

The raising and lowering, and supporting means of this invention are shown in detail in FIGURES 4 through 8. These means include upwardly extending tabs 20 defining opening 22 for securing of the tabs to the inner wall of the top 14 by means of fasteners 24. The tabs 20 are secured to the inner wall of a first tubular member 26. The bolt 28 is attached to a foot 30 which is formed at the bottom end of each tab 20 and which extends transversely between the side walls of the tube 26.

Additional tubes 32 and 34 are located around the tube 26, and these additional tubes provide a telescoping arrangement in combination with the outer tube 18 and the inner tube 26. To achieve the telescoping operation, the tube 26 defines an enlarged lower end portion 36, the tube 32 defines an enlarged lower end portion 38 and the tube 34 defines an enlarged lower end portion 40. In addition, the tube 32 defines a reduced upper end portion 42 which will be engaged by the enlarged lower end 36 of the tube 26 when this inner tube is moved upwardly relative to the tube 32. Similarly, the enlarged lower end 38 of the tube 32 will engage the reduced diameter portion 44 of the tube 34, and the enlarged lower end 40 of the tube 34 will engage the reduced diameter portion 46 of the outer tube 18, this latter engagement determining the limit of upward movement.

The bolt 28 is received in a threaded portion defined at the upper end 48 of tubular connecting rod 50. The lower end of this rod carries a spool 52 which provides means for attaching the end of wire 54. A flexible drive member 56 is received in the annular recess defined between the walls of the tubular member 50 and the end of the spool. This flexible drive member is preferably formed from a coil spring which when compressed will form a solid member for transmitting force during raising movement of the top but which will easily negotiate the right-angle turn from the horizontal to the vertical. Means other than a coil spring may be utilized to provide this flexible drive action provided that such other means will have equivalent supporting capability combined with the necessary flexibility.

The wire 54 and flexible member 56 extend to a nut 58 which is carried within the channel 60 defined by the transverse frame member 16. As best shown in FIGURE 8, the frame member 16 is formed in two parts with the channel 60 being defined by the lower part 62, and with the upper part 64 carrying a slotted member 66 adapted to interfit with the in-turned portion 68 of the lower portion. The outer edge of the upper portion 64 will rest on the flange 70 defined by the lower portion to provide an enclosed area.

A screw 72 is received by an appropriately threaded bore defined by each nut 58. In the embodiment shown, the screw 72 comprises an elongated rod having a wire 74 wrapped around and secured to its outer periphery. With this arrangement, the pitch of the screw can be quite large so that a relatively few revolutions are required for achieving a relatively great amount of movement for the nuts and associated flexible drives 56.

The end of the screw 72 carries a bevel gear 76 which mates with bevel gear 78 carried at the end of crank arm 80. The arm 80 includes an extension 82 which carries a corresponding bevel gear at its end so that rotation of the crank arm can impart simultaneous driving movement to a screw 72 on both sides of the construction.

In the lowered position, the lower edge of the top 14 will rest on the upper edges of the tubes. The tab 20 and tubes 26, 32 and 34 are shown in a slightly extended position in FIGURE 4. For illustration purposes, however, it will be understood that in actual operation the tube 26 will extend fully before the tube 32 moves as shown in FIGURE 7. The lowermost position of the tabs is illustrated in FIGURE 3.

FIGURE 7 illustrates the use of a protective strip 84 which is connected to the lower edge of the top 14 so that the strip will cover any gap between the top edge of the box and the lower edge of the cover. This will prevent the entry of rain, etc., into the interior of the box.

In the operation of the construction, the user can elevate the top by rotating the crank arm 80. All four corners of the construction will be raised simultaneously, and in this connection, the bolt 28 provides a means for adjustment in the event that there are some differences in height between the corners. During elevation, the turns of the spring 56 will provide an essentially solid member so that the weight of the top can be effectively carried by this member. The telescoping arrangement will maintain the member 56 in a completely enclosed position even at the maximum elevation of the top.

The lowering action is accomplished by reverse rotation of the crank arm, and in this connection, the wire 54 may come into play. It will be noted that the weight of the top may result in the top being lowered by gravity; however, the wire 54 will insure that all four corners are lowered at the same rate. During the lowering movement, the members 56 provide support for the top so that an extremely smooth operation can be accomplished.

It will be understood that various changes and modifications may be made in the above described construction which provide the characteristics of this invention without departing from the spirit thereof particularly as defined in the following claims.

That which is claimed is:

1. A structure for raising and lowering, and for supporting movable tops for campers and the like, said structure comprising flexible drive members, said flexible drive members extending from a substantially horizontal position, through a substantially right angle bend and to a substantially vertical position, means operatively connecting the flexible drive members at spaced points along said top, means for moving said flexible drive members comprising nuts attached at the end of each member and a drive screw extending through said nuts, rotation of said drive screw operating to move said nuts and the associated flexible drive means to raise and lower said top, guide means for directing said flexible drive means between said horizontal and vertical positions, and means for supporting said flexible drive means when in the vertical position, said flexible drive means comprising a coil, the turns of said coil being in engagement with each other whereby said coil is adapted to bend while transmitting force for moving said top.

2. A structure in accordance with claim 1 wherein said flexible members are connected at the four corners of said top, said drive screw extending through the nuts associated with two of said flexible members, a crank for rotating said drive screw, and an extension of said crank connected to a second drive screw, said second drive screw extending through the nuts associated with the other two flexible drive means.

3. A structure in accordance with claim 1 including wire means having one end connected to said nuts and the other end connected to said top whereby rotation of said drive screw to lower said top results in a positive downward pull on said top through said wire means.

4. A structure in accordance with claim 1 including a plurality of telescoping tubular members located in surrounding relationship relative to said flexible drive means whereby said drive means are enclosed in the raised position.

5. A structure in accordance with claim 1 including an overhanging strip attached along the sides of said top on the exterior thereof, said strip extending over the gap between said top and the camper body when the top is in the lowered position.

6. A structure for raising and lowering, and for supporting movable tops for campers and the like, said structure comprising flexible drive members, said flexible drive members extending from a substantially horizontal position, through a substantially right angle bend and to a substantially vertical position, means operatively connecting the flexible drive members at spaced points along said top, means for moving said flexible drive members comprising nuts attached at the end of each member and a drive screw extending through said nuts, rotation of said drive screw operating to move said nuts and the associated flexible drive means to raise and lower said top, guide means for directing said flexible drive means between said horizontal and vertical positions, and means for supporting said flexible drive means when in the vertical position, and wherein said screw means comprises a rod having a wire wrapped along its length, the turns of said wire serving as the threads of the screw, the spacing between said turns being substantially greater than the diameter of said wire to provide a high pitch for said screw.

7. A structure for raising and lowering, and for supporting movable tops for campers and the like, said structure comprising flexible drive members, said flexible drive members extending from a substantially horizontal position, through a substantially right angle bend and to a substantially vertical position, means operatively connecting the flexible drive members at spaced points along said top, means for moving said flexible drive members comprising nuts attached at the end of each member and a drive screw extending through said nuts, rotation of said drive screw operating to move said nuts and the associated flexible drive means to raise and lower said top, guide means for directing said flexible drive means between said horizontal and vertical positions, and means for supporting said flexible drive means when in the vertical position, and wherein the means operatively connecting the flexible drive means to said top include vertically extending rigid connecting means secured to the upper end of said flexible drive means, a tab for attachment to said top and means for adjusting the spacing between said tab and said connecting means.

References Cited

UNITED STATES PATENTS

| | | | |
|---|---|---|---|
| 2,193,352 | 3/1940 | Thomas | 296—23 |
| 3,024,059 | 3/1962 | Hagenson | 296—23 |

PHILIP GOODMAN, Primary Examiner

U.S. Cl. X.R.

52—66; 296—137